Oct. 7, 1969    W. E. KRAUSE ET AL    3,470,868
ULTRASOUND DIAGNOSTIC APPARATUS
Filed June 7, 1965    6 Sheets-Sheet 1

INVENTORS
WALTER ERICH KRAUSE
RICHARD ERNST SOLDNER
OTTO HEINZ KRESSE

BY _________ ATTORNEYS

United States Patent Office 3,470,868
Patented Oct. 7, 1969

3,470,868
ULTRASOUND DIAGNOSTIC APPARATUS
Walter Erich Krause, Richard Ernst Soldner, and Otto Heinz Kresse, Erlangen, Germany, assignors to Siemens Aktiengesellschaft, Erlangen, Germany, a corporation of Germany
Filed June 7, 1965, Ser. No. 462,138
Claims priority, application Germany, June 6, 1964, S 91,421; May 29, 1965, S 97,369
Int. Cl. A61b 5/10
U.S. Cl. 128—2
17 Claims

ABSTRACT OF THE DISCLOSURE

An apparatus for the application of a medical examination procedure utilizing ultrasonic waves according to the impulse-echo method including a water tight applicator containing a cylindrical parabolic reflector having an opening covered with a water tight diaphragm that allows the passage of ultrasonic waves for coupling to the patient, at least one ultrasonic transmitter/receiver arranged on a shaft that projects from the apparatus into the applicator on the focal line of the parabolic reflector, and which can be rotated and adjusted in the longitudinal direction of the shaft by the motor, the transmitter/receiver being arranged on the shaft at an angle between 35° and 70°, the surface of the applicator opening covered with the diaphragm being approximately perpendicular with the direction of propagation of the ultrasonic energy which is emitted from the transmitter and reflected from the parabolic reflector.

---

The present invention concerns an ultrasonic diagnostic apparatus working on the impulse-echo principle. The echo-impulse is made visible through the use of an image tube.

A principal object of the present invention is to provide an apparatus which can be used for practical ultrasonic-optical examination to achieve a lifelike reproduction of the body part under examination, i.e., to compensate for the distortion that can be caused by the scanning mechanism of the apparatus.

A further object of the present invention is to achieve good contact between the apparatus and the patient's body. Another object of the present invention is to provide a construction calling only for simple production techniques.

Yet another object of the invention is to provide improved examination of parts of the body, by means of which sure diagnostic conclusions can be reached.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

FG. 1 is a plan view of a cylindrical parabolic reflector disposed about an ultrasonic transmitter/receiver;

FIG. 2 is a schematic view of an ultrasonic diagnostic apparatus in accordance with the principles of the present invention;

FIG. 3 is a perspective view of an ultrasonic diagnostic apparatus with certain portions cut away to more clearly identify the structure;

FIG. 3a is an enlarged fragmentary view of the upper portion of the shaft 8 of FIG. 3;

FIG. 3b is a sectional view of the shaft of FIG. 3a;

Figures 1, 2:
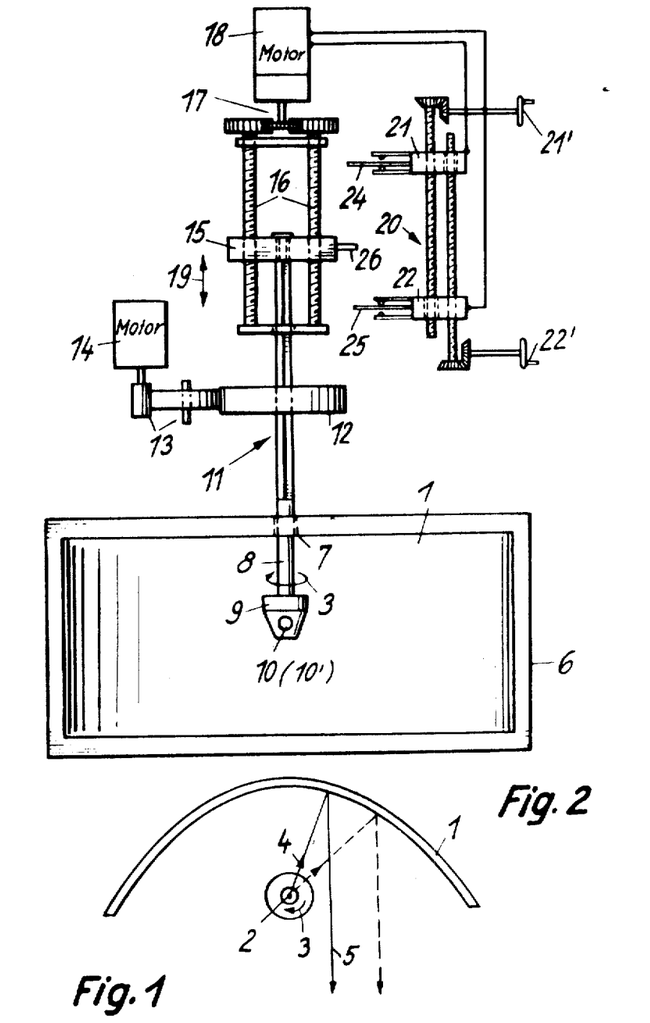

As illustrated in FIG. 1, a cylindrical parabolic reflector 1, has arranged in its focal line 2 an ultrasonic transmitter/receiver that is rotatable about the focal line 2 in the direction of the arrow 3. The transmitting direction of the transmitter is shown by arrow 4. The ultrasonic waves emitted from the transmitter strike the reflecting inner wall of the reflector 1 and are reflected in the direction of arrow 5. The dotted arrow shows the direction of the ultrasonic beam when the transmitter has rotated a little futrher. It can be seen that the reflector waves run parallel to each other.

The cylindrical parabolic reflector 1 is situated in the tank 6, FIG. 2, which is filled with water and sealed at the back with a diaphragm 28'. The shaft 8 enters the tank 6 at an aperture 7 so that it is watertight, and coaxial with the focal line of the parabolic reflector 1. A head end 9 is attached to the end of the shaft 8, situated in tank 6, and in the head end two ultrasonic transmitter/ receivers 10, 10' are arranged symmetrically to the axis of the shaft 8. In FIG. 2 only the transmitter/receiver 10 is visible. Section 11 of the shaft 8 is formed as a sectional bar, FIG. 3, and is supported by sleeve 12 which is driven by a friction gear 13 from an electric motor 14. The shaft is further supported by the bearing block 15 in such a way that it can rotate, and the bearing block 15 is in turn connected to the spindles 16, which are driven via gear 17 from motor 18 and are adjustable in the longitudinal direction of the shaft (double arrow 19). When both motors 14 and 18 are running, the shaft 8 is rotated in the direction of arrow 3, FIG. 2, with the transmitter/receivers 10, 10', and also adjusted in the direction of double arrow 19. In this way a linear scanning of an object placed in front of the opening of tank 6 is achieved with the ultrasonic waves sent out from the transmitter/ receivers.

It is often desirable to scan the object under examination more than once, and this refers particularly to the body areas where malignant tissue transformation takes place. For this reason, motor 18 is provided with a reversing device 20, which in this instance consists of two microswitches 21, 22, which are adjustable at will by means of manually operated worm-drives 21' and 22'. The actuating organs 24, 25 of these switches project in the path of a control cam provided on the bearing block 15. As soon as the bearing block has moved far enough in one direction on its spindles 16 for its control cam 26 to actuate one of the microswitches, the sense of rotation of the motor is changed, so that the bearing block is moved to the other side until the control cam actuates the other microswitch, which then reverses the direction of motor rotation once again.

In the following description those parts already numbered in FIG. 2 retain the same numbers in FIG. 3. The tank 6, in which the cylindrical parabolic mirror 1 is housed, consists of a plastic frame 27, whose opening 28 on the reflector side is covered with a diaphragm 28', and whose window-like opening, opposite the sealing plate 29 (not visible), is sealed watertight against the above plate 29. For this purpose the window frame is secured to the plate with the screws 30. The shaft 8 protrudes through the plate 20 into the tank, and contains in its head piece the two transmitter/receivers 10, 10′. The assembly is so made that the shaft passes coaxial to the focal line of the parabolic reflector, and the two radially mounted transmitter/receivers lie symmetrically in relation to longitudinal axis of the shaft. Electrical connection cables 31 are led to the transmitter/receivers through the hollow shaft 8.

The shaft 8 is round from the end bearing the transmitter/receivers to the point marked 32 (more easily sealed than a square bar). The part connection to this point, part 11, FIG. 2, is designed as square bar 33, whose diagonal exension is no greater than the diameter of the round bar part. The shaft is again round at its end 34.

The shaft is supported by a bearing frame 35 mounted on the sealing plate. This frame is provided with a hole 36, in which the rotatable sleeve 37 is mounted. Between the sleeve 37 and the shaft 8, on a level with the sealing plate 29 there is inserted a washer 38. This sleeve 37 has a blind hole 39, the diameter of which corresponds to that of the shaft 8 (between the head piece 9 and point 32). Within the sleeve this blind hole joins an opening 40 which corresponds to the square profile of the shaft. The sleeve 37 is mounted firmly axially in the sealing plate with ball bearing 41, and is made watertight by means of the washer 42 against the tank 6. Sleeve 37 is provided with a flange 43 which serves as a drive connection to a friction roller 44 (friction drive 13), which is driven by motor 14 and is mounted on an oscillating friction roller. The rotation of sleeve 37 has the effect that via the square sections shaft 8 and consequently the two transmitter/receivers 10, 10′ are turned simultaneously. The end of the shaft (not shown) opposite the transmitter/receivers can rotate in the bearing block 15, but is mounted firm on it axially. The bearing block 15 itself can be adjusted on the spindles 16 provided in the mounting frame 35 in the longitudinal direction of the shaft, as indicated by double arrow 19. The spindles are driven by the motor 18 via the gear mechanism 17. Thus, when running, the bearing block 15 moves the rotating shaft 8 with the transmitter/receivers back and forth in the direction of the double arrow 19, depending on the sense of rotation of the motor.

The leads 31 for the transmitter/receivers 10, 10′, which are run through the hollow bar shaft, end in a collector 45 mounted on the rear end of the bar shaft. The contact race of the collector is interrupted at two opposite points 46, 46′, FIGS. 3a and 3b. In FIG. 3a the connection of the leads 31 to the two collector surfaces is shown. In FIG. 3b the collector 45 and the two parts of the collector surface between the points 46 and 46′ are shown in plan view.

In the bearing block 15 there are two carbon slip contacts 47, which are pressed against the collector surface by the springs 48. For the connection of the collector electrodes, which are provided in a pair for better contact, a connection armature 49 is fixed at the bearing block. The ground connections from the transmitter/receivers 10, 10′ stand above the metal parts—shaft 8, mounting frame 35 and bearing block 15—connected to an earthing collector (provided in the bearing block but not shown). The electrical connection of the transmitter/receivers with the shaft 8 is achieved by means of a conductive coating on the head piece.

Figures 3, 3A, 3B:
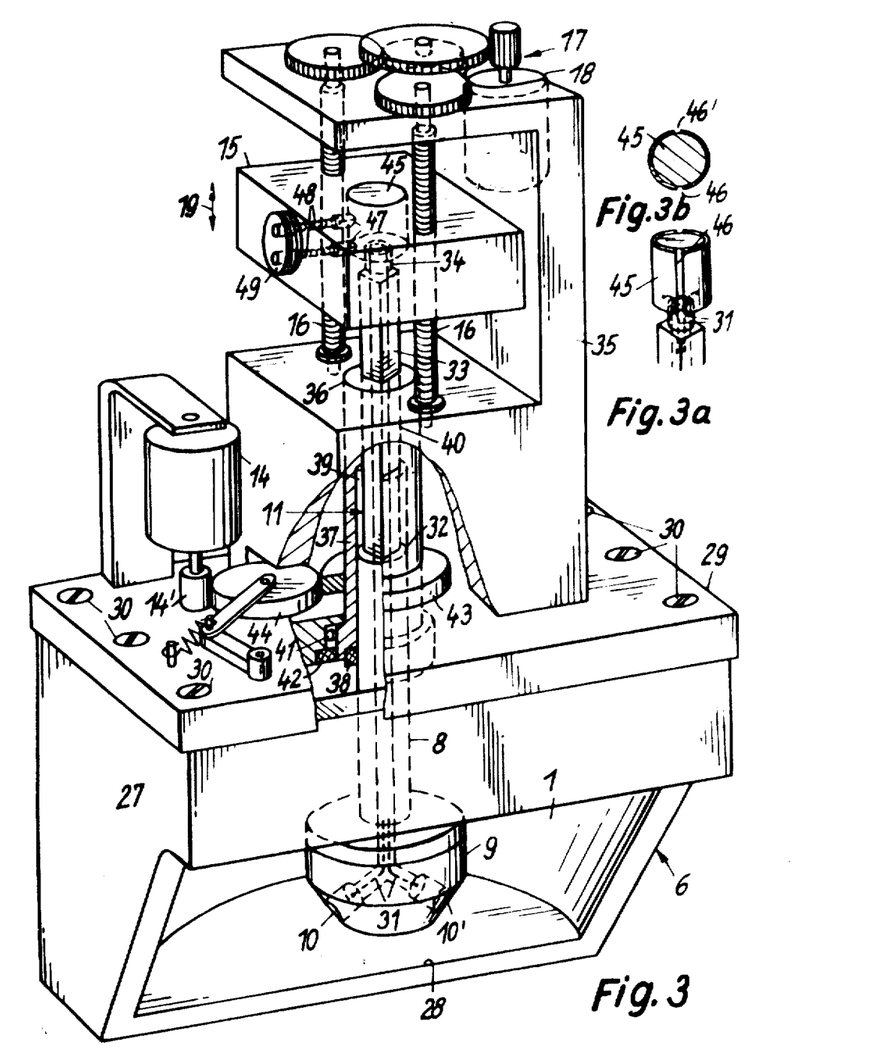
Figure 4:
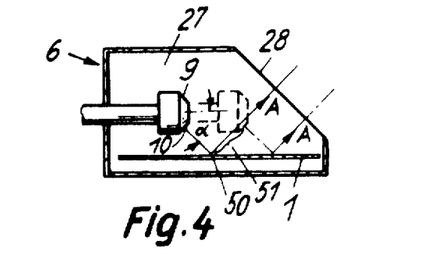
FIG. 4 is a fragmentary view of the shaft operating on the transmitter/receiver adjacent the reflector.

In the description in FIG. 3, for easy understanding of the functioning of the apparatus, it has been stated that the two transmitter/receivers 10, 10′ are arranged radially seen from the shaft 8. The beam sent out from the transmitters 10, 10′ and reflected off the reflector 1—in the scope of the angle of the parabola—would, if this were in the case, reflect back on to the transmitter head and be lost for the examination of the tissue. This invention therefore provides that the transmitters should not be arranged radially (at 90° to the rotating axis), but at a very slight angle $\alpha$, FIG. 4, so that the reflected beam misses both the shaft 8 and the head piece 9.

Before the most suitable transmitter-reflector angle in relation to the mirror was ascertained, trials were made, which showed that, if the ultrasonic beam struck the reflector at a very steep angle, an undesirable change in the compression cycle of the beam in its transversal surge occurred, and the reflector itself was caused to make thickness vibrations at the same time, which led to a lengthening of the impulse, and thus a deterioration in image quality. The results of the tests showed that the beam must strike the reflector at an angle which at least corresponds to the total reflection angle. With the metal reflector used, the total reflection angle lies beween 35 and 40°. The suitable range for the angle at which the beam should strike the reflector was determined to lie between 40 and 65°. In the above construction plan the angle was set at 45°. This angle is also very suitable in so far as the ultrasonic energy thus leaves the apparatus at an angle of 45° to the rotating axis (shaft 8), which makes possible a very favorable coupling of the apparatus to the patient's back. Were the transmitter/receivers arranged radially, then the ultrasonic energy would leave the apparatus at right angles to its longitudinal front, which would mean that the apparatus could only be applied to relatively flat parts of the body, and not, for example, to the patient's neck, except with some difficulty.

By displacing the ultrasonic transmitter/receiver along the focal line, the duration of the sound is altered, because of the change in its path between the respective point of reflection 50 on the reflector 1 to the surface of the opening of the applicator, against which the tissue under examination is laid. The applicator has been shown up to now as tank 6. By shifting the head piece 9, toward the positon marked with a dash the path of the beam is shortened by the distance 51. It can also be seen from FIG. 4 that the surface of the opening 28 of the applicator is at right angles to the direction of the propagation of the ultrasonic energy, emitted by the transmitter/receiver and reflected by the reflector 1. This altering of the duration of the beam would be evident on the screen as a shifting of the image, and this would render evaluation of the image difficult for the doctor.

Figure 5:
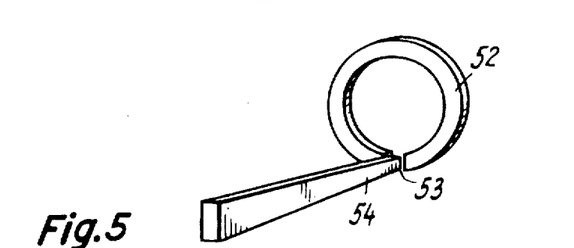
FIG. 5 is an enlarged view of an induction coil disposed adjacent a wedge-shaped metal part for use in the invention.
Figure 6:
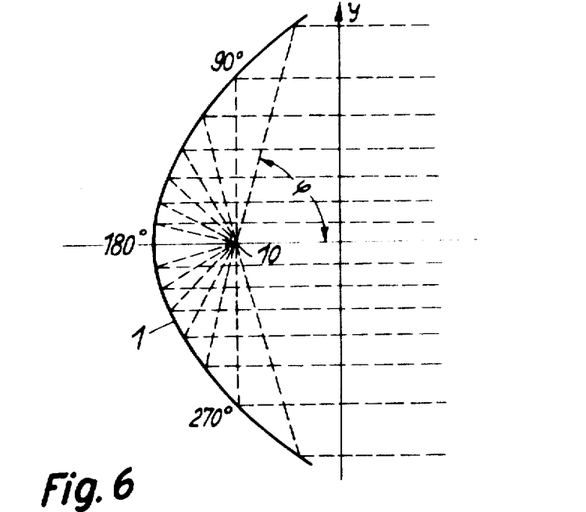
FIG. 6 is a ray-diagram.
Figure 7:
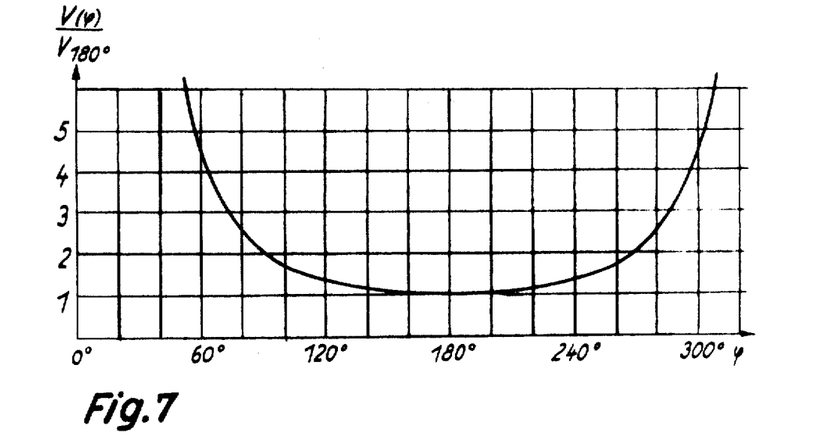
FIG. 7 is a graph of the angle of rotation of the transmitter/receiver versus the ratio of the velocity related to the angle of rotation over the velocity at the crest of the parabola.

The invention provides automatic means for compensating for this altering of the duration of the beam, which electrically hinder the shifting of the image. For this purpose the mounting frame 35, FIG. 3, is provided with an induction coil 52, FIG. 5, with an air gap 53 on which actuates a wedge-shaped metal part 54 provided in the sliding carriage 15, FIG. 3. According to the movement of the sliding carriage and the transmitter/receivers the metal part penetrates more or less in the air gap, which alters the inductivity of the coil; this serves as a correction of the change in beam duration on the image reproduction tube. According to the prototype in FIG. 3 the motor 14 runs at a constant angular frequency, so that via the circular rollers 43 and 44 the transmitters 10, 10′ are rotated at a uniform anglar frequency $\omega$. The beam reflected by the reflector 1 from the transmitter moves faster in the y direction toward the edges of the parabola than in the central portion, FIG. 6. As a result, the density of information received on the reproduced image is not constant, but greater in the central portion than at the fringes. In later models of the invention this inconsistency should be hindered by a gear which transforms the constant angular frequency $$\omega(\varphi) = \bar{\omega} \cdot c \frac{\sin^2 \varphi}{1 + \cos \varphi}$$

where, $\bar{\omega}$ = constant angular frequency of the motor
$\omega$ = desired angular frequency of the transmitter
$\varphi$ = angle of rotation
$c$ = a constant A curve of the normalized velocity $v(\varphi)$ to the velocity at the crest of the parabola $v(180°)$ as a function of the angle of rotation $\varphi$ is shown in FIG. 7.

Figure 8:
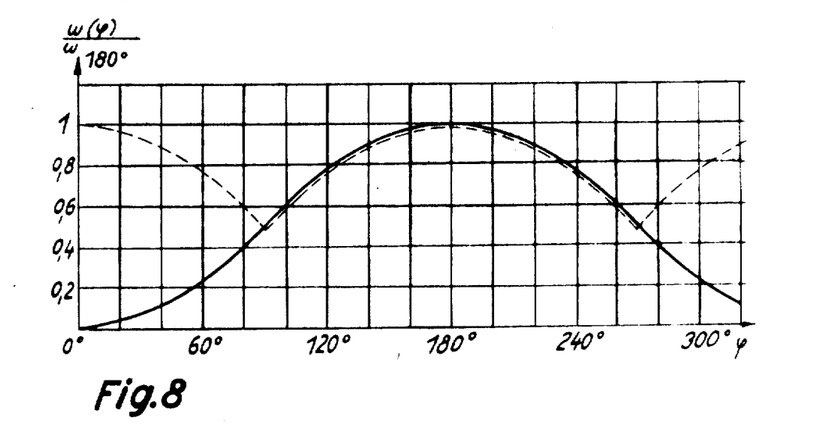
FIG. 8 is a graph of the angle of rotation versus the normalized angular frequency.

The character of the desired normalized angular frequency $\omega$ is a function of the angle $\varphi$. This form of the angular frequency is necessary in order to obtain a constant scanning speed of the beam in the y direction. Corresponding to the curve in FIG. 8 there is a cam plate 55 formed as in FIG. 9, having an oval shape.

Figure 10:
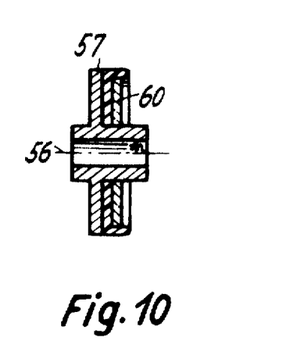
FIG. 10 is a cross section of the cam plate of FIG. 9.

The axis of the plate 57 is shown as 56, and to this is screwed a disc 60 by means of screws 58 and 59, which holds a friction surface to the plate 57, FIG. 10.

Figure 9:
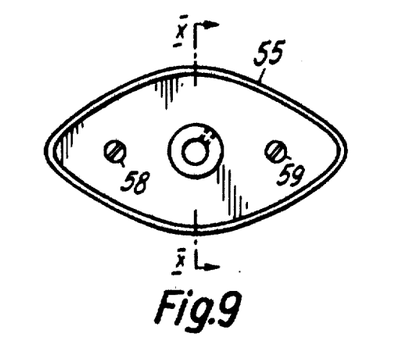
FIG. 9 is an end view of a cam plate.
Figure 11:
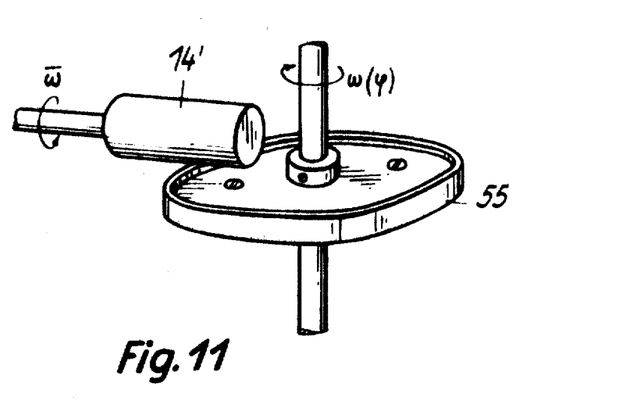
FIG. 11 is an alternative shape of cam plate.

The cam plate 55, as shown in FIG. 9, is used instead of the transmission pulley 44, FIG. 3, to obtain a uniform scanning speed. However, it is possible to replace the plate 43 with the plate 55 of FIG. 11, and to make the friction roller 14', FIG. 3, of the motor 13 actuate the friction surface of the cam plate 55 directly as illustrated. The cam plate transforms the constant speed of the motor 14 ($\omega$) in to an inconstant speed $\omega(\varphi)$, which satisfies the function $$\omega(\varphi) = \frac{\overline{\omega} \cdot c \sin^2 \varphi}{1 + \cos \varphi}$$

Figure 12:
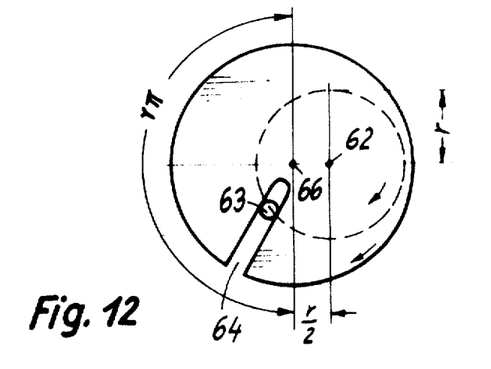
FIGS. 12–14 illustrate a simple gear to be used in place of a cam plate.
Figure 13:
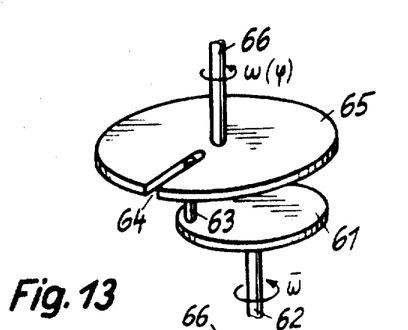
Figure 14:
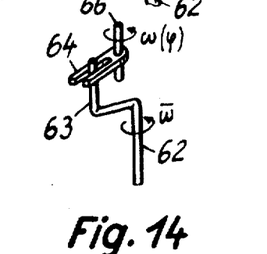

Alternatively, a simpler gear can be used, as illustrated in FIGS. 12 to 14. On the circumference of the disc 61, which is driven about its axis 62 with constant angular frequency $\omega$, is a pivot 63 which stand upright and runs parallel to the drive shaft 62. This pin engages the radial slot 64 of another plate 65, whose mid axis runs at half the distance of the radius of the first plate 61. This very simple assembled gear permits the transformation of a constant speed into a variable sped, which closely approximates the above formula.

FIG. 14 shows a solution in which, instead of the above-mentioned plates, only the principal parts for the functioning method, such as cranks 62–63 and shaft 66 with radial control, are illustrated.

Although minor modifications might be suggested by those versed in the art, it should be understood that we wish to embody within the scope of the patent warranted hereon, all such modifications as reasonably and properly come within the scope of our contribution to the art.

We claim as our invention:

1. Apparatus for the application of a medical examination procedure using ultrasonic waves of the impulse-echo type having a water-tight applicator incorporated in the apparatus including a cylindrical parabolic reflector having an opening covered with a watertight diaphragm permitting the passage of ultrasonic waves to the patient, said applicator having at least one ultrasonic transmitter/receiver arranged on a shaft that projects from the apparatus into the applicator on the focal line of the parabolic reflector, a motor, said transmitter/receiver being rotatable and adjustable in the longitudinal direction of the shaft by said motor, said transmitter/receiver being arranged arranged on the shaft at an angle between 35° and 70°, and the surface of the applicator opening covered by said diaphragm with the direction of propagation of the ultrasonic energy emitted from the transmitter and reflected by the parabolic reflector being an angle of approximately 90°.

2. Apparatus according to claim 18 having an electric motor with constant angular frequency for the rotating of the transmitter/receiver and a gear, said gear transforming the constant angular frequency of said motor into a variable angular frequency according to the formula $$\omega(\varphi) = \frac{\overline{\omega} \cdot c \sin^2 \varphi}{1 + \cos \varphi]}$$

where $\varphi$ represents the rotating angle of the transmitter $\overline{\omega}$ the constant angular frequency of the motor, c a constant and $\omega$ the desired angular frequency as a function of the rotating angle.

3. Apparatus according to claim 1, characterized by two ultrasonic transmitter/receivers being arranged symmetrically to the focal line of said reflector and opposite each other and both rotatable with the focal line as an axis, said transmitter/receivers being jointly adjustable in the direction of the focal line by means which hinder that transmitter/receiver from transmitting or receiving which is at any given moment diverted by the reflector.

4. Apparatus according to claim 1 including means for the automatic compensation for alterations in wave duration while the wave is travelling between transmitter, reflector, and diaphragm, which may be caused by the displacement of the transmitter/receiver in the longitudinal direction of the focal line of the parabolic reflector.

5. Apparatus according to claim 4, characterized by the fact that said means for the automatic compensation consist of an induction coil with an air gap, and a wedge-shaped metal part inserted in the air gap, the metal part moving more or less into the air gap according to the movement of the transmitter/receiver.

6. Apparatus according to claim 2 characterized by the fact that the drive consists of a cam plate.

7. Apparatus according to claim 2 characterized by the fact that the gear comprises one shaft for the drive with constant angular frequency, and a second shaft for the drive with variable frequency, said second shaft having a radially extending guide said shafts being arranged parallel to one another and at a distance that is half that of the radial distance of the part of the guide which contacts the first shaft.

8. Apparatus according to claim 3 characterized by the fact that the two transmitter/receivers are situated in the head end of the shaft, which for at least part of its length has a profile other than circular and is housed in a sleeve of corresponding inner profile so that it is movable in a longitudinal direction, such sleeve being mounted so that it can be rotated in a support which is built together with the parabolic reflector, and whose axis coincides with the focal line of the reflector.

9. Apparatus according to claim 8, characterized by the fact that the shaft is hollow and contains the electrical connections for the transmitter/receivers.

10. Apparatus according to claim 9, characterized by the fact that an electrically driven friction drive is provided for the rotation of the sleeve.

11. Apparatus according to claim 8 characterized by the fact that the shaft has its end opposite the transmitter/receivers mounted in a bearing block so that it can rotate, which bearing block is adjustable in its mounting in the longitudinal direction of the shaft.

12. Apparatus according to claim 11, characterized by the fact that an electric spindle drive is provided in the mounting frame for the adjusting of the bearing block.

13. Apparatus according to claim 3, characterized by the fact that only the transmitter/receiver facing the reflector is connected to a high frequency transmitter/receiver, in order to preclude the radiation and reception from the ultrasonic energy from the transmitter/receiver turned away from the reflector, while a switch mechanism, dependent on the rotation of the shaft and the position of the two transmitter/receivers, is provided for changing the connection at every half turn of the shaft.

14. Apparatus according to claim 13, characterized by the fact that the switch mechanism has a collector which rotates with the shaft, and whose circular contact race is interrupted by two insulating strips situated opposite each other.

15. Apparatus according to claim 14, characterized by the fact that each contact race is electrically connected to one of the two transmitter/receivers with an electrical contact through the leads inserted in the hollow shaft.

16. Apparatus according to claim 8, characterized by a control cam mounted on the longitudinally adjustable bearing block, and two switches for changing the sense of rotation of the motor that adjusts the bearing block, which are arranged with their contacts projecting in the path of the control cam, and each being adjustable in respect to the other.

17. Apparatus according to claim 8, characterized by the fact that the electric motor for the adjusting of the bearing block and the sectional bar is provided with a contacting device for setting the speed of the motor.

References Cited

UNITED STATES PATENTS

| 2,913,602 | 11/1959 | Joy | 310—8.3 |
|---|---|---|---|
| 3,237,623 | 3/1966 | Gordon | 128—24.05 |
| 3,323,512 | 6/1967 | Clynes | 128—2 |
| 3,334,622 | 8/1967 | Brech | 128—2 |
| 3,338,235 | 8/1967 | Gordon | 128—24 |

L. W. TRAPP, Primary Examiner

PO-1050
(5/69)

UNITED STATES PATENT OFFICE
CERTIFICATE OF CORRECTION

Patent No. 3,470,868      Dated October 7, 1969

Inventor(s) Walter Erich Krause, Richard Ernst Soldner and Otto Heinz Kre

It is certified that error appears in the above-identified patent and that said Letters Patent are hereby corrected as shown below:

Column 2, line 25, "futrher" should read -- further --.

Column 3, line 5, "plate 20" should read -- plate 29 --.

Column 4, line 23, "back" should read -- body --.

Column 5, line 17, "motor 13" should read -- motor 14 --;

line 34, "sped" should read -- speed --;

line 64, "claim 18" should read -- claim 1 --.

Column 6, line 38, "such" should read -- said --.

**SIGNED AND
SEALED
MAY 12 1970**

(SEAL)
Attest:

Edward M. Fletcher, Jr.
Attesting Officer

WILLIAM E. SCHUYLER, JR.
Commissioner of Patents